(12) United States Patent
Djuknic et al.

(10) Patent No.: US 6,964,374 B1
(45) Date of Patent: Nov. 15, 2005

(54) RETRIEVAL AND MANIPULATION OF ELECTRONICALLY STORED INFORMATION VIA POINTERS EMBEDDED IN THE ASSOCIATED PRINTED MATERIAL

(75) Inventors: Goran M. Djuknic, Jersey City, NJ (US); John Freidenfelds, Madison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/166,144

(22) Filed: Oct. 2, 1998

(51) Int. Cl.[7] .......................................... G06K 7/10
(52) U.S. Cl. .................. 235/462.01; 707/10
(58) Field of Search ............... 235/462.01, 462.45, 235/462.46, 462.49, 468, 470, 472.03, 375, 235/435, 462.08, 462.25, 462.16; 707/2, 707/4, 10, 1; 283/70, 72, 90, 113, 901; 705/23, 705/26–27

(56) References Cited

U.S. PATENT DOCUMENTS

| | | | |
|---|---|---|---|
| 3,752,958 A * | 8/1973 | Gilberg et al. ................. 238/92 |
| 4,654,482 A * | 3/1987 | DeAngelis .................... 379/95 |
| 4,727,014 A * | 2/1988 | Horn et al. .................. 430/321 |
| 4,728,784 A * | 3/1988 | Stewart .................. 235/462.01 |
| 4,831,610 A * | 5/1989 | Hoda et al. .................... 369/48 |
| 4,884,974 A | 12/1989 | DeSmet ....................... 434/317 |
| 4,916,441 A | 4/1990 | Gombrich .................... 345/169 |
| 4,958,064 A * | 9/1990 | Kirkpatrick ................. 235/384 |
| 5,177,800 A * | 1/1993 | Coats .......................... 381/51 |
| 5,206,490 A * | 4/1993 | Petigrew et al. ............ 347/100 |
| 5,288,976 A * | 2/1994 | Citron et al. ................ 235/375 |
| 5,288,985 A | 2/1994 | Chadima, Jr. et al. .. 235/462.45 |
| 5,324,922 A * | 6/1994 | Roberts ....................... 235/375 |
| 5,326,959 A * | 7/1994 | Perazza ....................... 235/379 |
| 5,331,547 A * | 7/1994 | Laszlo .................... 364/413.01 |
| 5,334,822 A * | 8/1994 | Sanford ........................ 705/28 |
| 5,382,776 A * | 1/1995 | Arii et al. .................... 235/375 |

(Continued)

FOREIGN PATENT DOCUMENTS

JP       62-050955       * 3/1987

(Continued)

OTHER PUBLICATIONS

Book Stacks, Selected document from Books.com Web site describing Book Stacks Unlimited links partner program, downloaded and printte Jun. 20, 1997 and Jun. 23, 1997.*

(Continued)

*Primary Examiner*—Diane I. Lee

(57) ABSTRACT

A method of retrieving and manipulating electronic information that relates to a printed document. Each printed document contains an initialization marking that is recognizable by an external sensory device and unique to the printed document. When a reader of the printed document desires to retrieve and manipulate electronic information that relates to the printed document, the reader initializes the system by using the sensory device to recognize the initialization marking. The sensory device transfers a code embedded in the initialization marking to a computing device. This configures the computing device to access the stored data and instruction sets associated with the printed document. In addition to the initialization marking, areas throughout the printed document (e.g., text, tables, figures, etc.) also contain markings that are recognizable by the external sensory device. The reader of the printed document uses the sensory device to recognize the markings and transfer the code embedded in the markings to the computing device. The computing device uses the code to retrieve and display the electronic information that relates to that area of the printed document.

25 Claims, 5 Drawing Sheets

U.S. PATENT DOCUMENTS

| | | | | |
|---|---|---|---|---|
| 5,415,553 | A | * | 5/1995 | Szmidla .................... 434/309 |
| 5,453,600 | A | * | 9/1995 | Swartz ..................... 235/375 |
| 5,468,951 | A | | 11/1995 | Knowles et al. ........ 235/462.22 |
| 5,525,798 | A | | 6/1996 | Berson et al. ............. 250/271 |
| 5,640,193 | A | | 6/1997 | Wellner ..................... 348/7 |
| 5,693,693 | A | * | 12/1997 | Auslander et al. ........... 524/88 |
| 5,734,823 | A | * | 3/1998 | Saigh et al. ............... 709/229 |
| 5,742,039 | A | * | 4/1998 | Sato et al. ............. 235/462.07 |
| 5,774,666 | A | * | 6/1998 | Portuesi ................ 395/200.48 |
| 5,791,991 | A | * | 8/1998 | Small ....................... 463/41 |
| 5,903,904 | A | * | 5/1999 | Peairs ..................... 707/526 |
| 5,913,210 | A | * | 6/1999 | Call ......................... 707/4 |
| 5,930,474 | A | * | 7/1999 | Dunworth et al. ..... 395/200.47 |
| 5,930,512 | A | * | 7/1999 | Boden et al. ............. 395/710 |
| 5,932,863 | A | * | 8/1999 | Rathus et al. .......... 235/462.15 |
| 5,933,829 | A | * | 8/1999 | Durst et al. ................ 707/10 |
| 5,978,773 | A | * | 11/1999 | Hudetz et al. ............... 705/23 |
| 5,982,956 | A | * | 11/1999 | Lahmi ..................... 382/306 |
| 6,012,090 | A | * | 1/2000 | Chung et al. .............. 709/219 |
| 6,029,141 | A | * | 2/2000 | Bezos et al. | |
| 6,068,188 | A | * | 5/2000 | Knowles ............... 235/462.01 |
| 6,081,629 | A | * | 6/2000 | Browning ................. 382/313 |
| 6,191,406 | B1 | * | 2/2001 | Nelson et al. .......... 250/208.1 |

FOREIGN PATENT DOCUMENTS

JP           06111068 A * 4/1994 ............ G06K 9/46

OTHER PUBLICATIONS

Netwatch, An article from the Gardian Newspapers, Author: Jack Schofield, published on Jun. 15, 1995.*

Monthly News, Summaries and Intelligence, "Screen Digest", pp. 54-55, Mar. 1998.

* cited by examiner

RETRIEVAL AND MANIPULATION OF ELECTRONICALLY STORED INFORMATION VIA POINTERS EMBEDDED IN THE ASSOCIATED PRINTED MATERIAL

FIELD OF THE INVENTION

The present invention relates to electronic information retrieval and, in particular, to a method for retrieving and manipulating electronic information via embedded pointers in printed materials.

BACKGROUND OF THE INVENTION

A book is a still unsurpassed information package, the basic design of which has survived unchanged for hundreds of years. Unlike many electronic media, books have a "display" that performs better with increasing environmental light, do not require batteries or electricity, are highly portable, are impervious to shock, and are resistant to water splashes, temperature extremes, and humidity. On the other hand, the range of information contained within a single book is inherently limited, the information content is often obsolete the moment the book is printed, the book cannot be easily indexed or searched, and the information obtained from it must be physically manipulated in some way before it can be sent to remote recipients (e.g. by copying followed by faxing or mailing or by electronic scanning and transmittal). Conversely, a desktop computer with an internal information base, including CD-ROMs, or a connection to the Internet, company intranet, or any other external information depository, provides virtually unlimited and fast information access. The desktop computer is frequently bulky, however, and is difficult to move within the office or home because of necessary power and communications connections (needing to be near a phone line or network connection, for instance). It is also uncomfortable to most users to read longer documents on the desktop's display because of insufficient contrast, flicker, low resolution and a relatively small display space, the latter in particular creating difficulty in scanning back to review passages recently read. A portable computer with wireless Internet, intranet, or database access can be used to solve the bulk and transport problems associated with a standard desktop computer while still allowing fast and convenient access to vast quantities of information, but comes with its own unique set of problems. Among these are the facts that the display of a portable computer generally works best in dim or dark conditions and is tiresome to look at for prolonged periods, its batteries are short-lasting, it suffers greatly when dropped, and its resistance to water, temperature extremes, and humidity is generally extremely limited.

Traditionally, interfaces between electronic and printed media are unidirectional, either translating electronic information to printed material, such as with a printer, or translating printed material to electronic, such as with one-dimensional or two-dimensional scanners. The few prior art systems attempting to link the two types of media have done so in a very restricted and limited way, such as the "Interactive Talking Book and Audio Player Assembly" taught in U.S. Pat. No. 4,884,974 (DeSmet, 1989) or the bar code VCR systems developed in the late 1980's. Bar codes are a well-known mechanism in the art for inputting identification information to an automated system, and can also be used for specifying a particular action to be taken, as taught, for example, in U.S. Pat. No. 5,288,976 (Citron et al., 1994).

In the DeSmet system, a bar code present on each page is used to trigger the system's audio player to play the recorded version of the words on that page. This triggering occurs automatically when the bar code is exposed to ambient light by the turning of the page; no user decision or selection is either required or possible. The recorded message is fixed at the time the system is made, presenting no opportunity for the information presented to be updated or altered. Functionally, the DeSmet system is therefore similar to the older "talking book" systems that required the user to perform a particular action, such as pushing a button or pulling a string, in order to hear the recorded version, with the exception that the DeSmet system uses the bar code device to trigger message playback automatically.

In the bar code VCR systems, the VCR is programmed by running a wandlike tool, such as a light pen, across a set of pre-provided printed bar codes specifying particular days of the week, times, and channels. The wand reads the information contained within the bar codes and then programs the VCR to record the specified channel on the specified day and time. The user must first look at the TV listings and identify the desired program to be recorded, select the bar code or codes that correspond to the day, time, length, and channel of the desired program from among those that are provided either with the VCR or within the TV listings, and then run the wand across the code(s) in order to program the VCR. If the user selects a wrong bar code from the set, such as by incorrectly calculating the necessary day, time, length, or channel, or by simply running the wand over the wrong bar code in the set, the desired function will not be performed; i.e. the program will not be properly recorded. As with the DeSmet system, the action performed in response to the reading of a particular bar code is fixed at the time the system is made, presenting no opportunity for the action performed to be updated or altered.

Neither of these systems provide the ability to perform a variable action or present potentially updated data in response to the reading in of a particular bar code or other mark. The DeSmet system further does not allow the user any control over the actions of the system (other than by turning the page), while the bar code VCR system does not allow the user to perform the desired action in a single mistake-proof step. What has been needed, therefore, is a new type of interface between printed and electronic media that allows convenient two-way access between electronic and printed information, combining the advantages and minimizing the disadvantages of the traditional one-way information interfaces, while providing both flexible information access and one-step convenience to the user.

One such system has been proposed by Wellner (U.S. Pat. No. 5,640,193). In the system of Wellner, marks are used on paper or other objects to control the selection of electronic services.

Accordingly, a primary object of the present invention is to facilitate "anytime, anywhere" information access by providing a seamless interface between large volumes of printed and electronic media. In particular, an object of the present invention is to provide a convenient access to in-depth, up-to-date information on a subject of choice, regardless of whether the information is maintained in electronic or printed form. A further particular object of this invention is to provide an interactive electronic index to printed information. Yet another particular object of this invention is to provide a way to easily and instantly electronically transfer information from a printed medium to a remote recipient.

SUMMARY OF THE INVENTION

A unique method of facilitating information access is described that facilitates the retrieval and manipulation of electronic information by using embedded pointers in printed materials. The application builds on wireless Internet access technology, which is becoming increasingly technically and economically feasible.

Although the invention concept is independent of any particular implementation, in one particular embodiment of the system, the user obtains the majority of the information from a book or other paper-printed source, while more in-depth, related, or updated material is obtained from, and visualized on, some electronic medium. A printed document, having one or more pages, contains areas of text, tables, illustrations, etc., some of which are marked. The markings can be made in any manner that can be recognized by some form of external sensory device, and more than one form of marking may be used in a document. A sensing device, uses a sensor to "read" the code embedded in the marking and then transfers the code to a computing device, which does further processing and subsequently acts upon the information in the mark by displaying electronic information, videos, etc.

In particular, an essential element of the invention is a special mark, called an initialization designator (e.g., an initialization marking or initialization mark), used to initialize the system when the user first begins to read a particular book or document. The user scans the initialization marking with the scanning device, which transmits a code or instruction to the computing device that tells the computing device what book or document is being read. This in turn allows the device to access the stored data and instruction sets associated with that particular book or document, in preparation for the user requesting additional data or actions through subsequent scanning of various internal document markings. In this manner, only the initialization mark needs to be unique between documents, thus allowing documents to be marked while still allowing the marks that are internal to any particular document to be kept quite small. Initialization markings may either take the same form as the in-text or margin markings used, or may take any other convenient form, so long as all markings used may be read by the sensing device or devices employed.

A hyperbook according to the present invention is a book which will be defined herein. Once a particular hyperbook has been designed and the system programmed to perform the relevant instructions, the user desiring to work with the hyperbook initializes the system for that book. This initialization is preferably performed by use of an initialization marking, but can also be performed in any of the many other ways known in the art, such as by selecting the title of the book off a menu provided on the computing device. After initialization of the system by reading in the initialization mark, the user reading the paper-printed hyperbook and encountering an image or a piece of text where some background information is desired scans the associated mark with the reader. The computing device calls up the relevant electronic information, which is displayed on the appropriate display device.

One of the particular advantages of the invention is to have a number of printed media sources that can last and be reused, so long as the appropriate data and/or links are maintained on the computing device and/or network. This advantage is particularly enabled by use of the initialization mark, an element of the invention that not only ensures that the proper data and/or instruction set is being accessed but also allows the internal marks used on one document to be re-used on a number of other printed materials, so long as each document has been linked to a different initialization mark. In a particular embodiment applying to books, since the International Standard Book Number (ISBN) contains the publisher's code and the book code, all the initialization information can be deduced from the already-existing ISBN. The user therefore initializes the system before beginning to read the hyperbook by reading the bar code associated with the book's ISBN number.

DETAILED DESCRIPTION

In the method of the invention, the user is facilitated in obtaining information by use of the most convenient source, be that source in printed (e.g book) or electronic form. In general, the user obtains the majority of the information from a book or other paper-printed source, while more in-depth, related, or updated material is obtained from, and visualized on, some electronic medium (e.g. a computer display). The method of the invention accomplishes this goal by use of the hypertext paradigm from the electronic world to produce a "hyperbook" or other electronic index to printed information.

Figure 1:
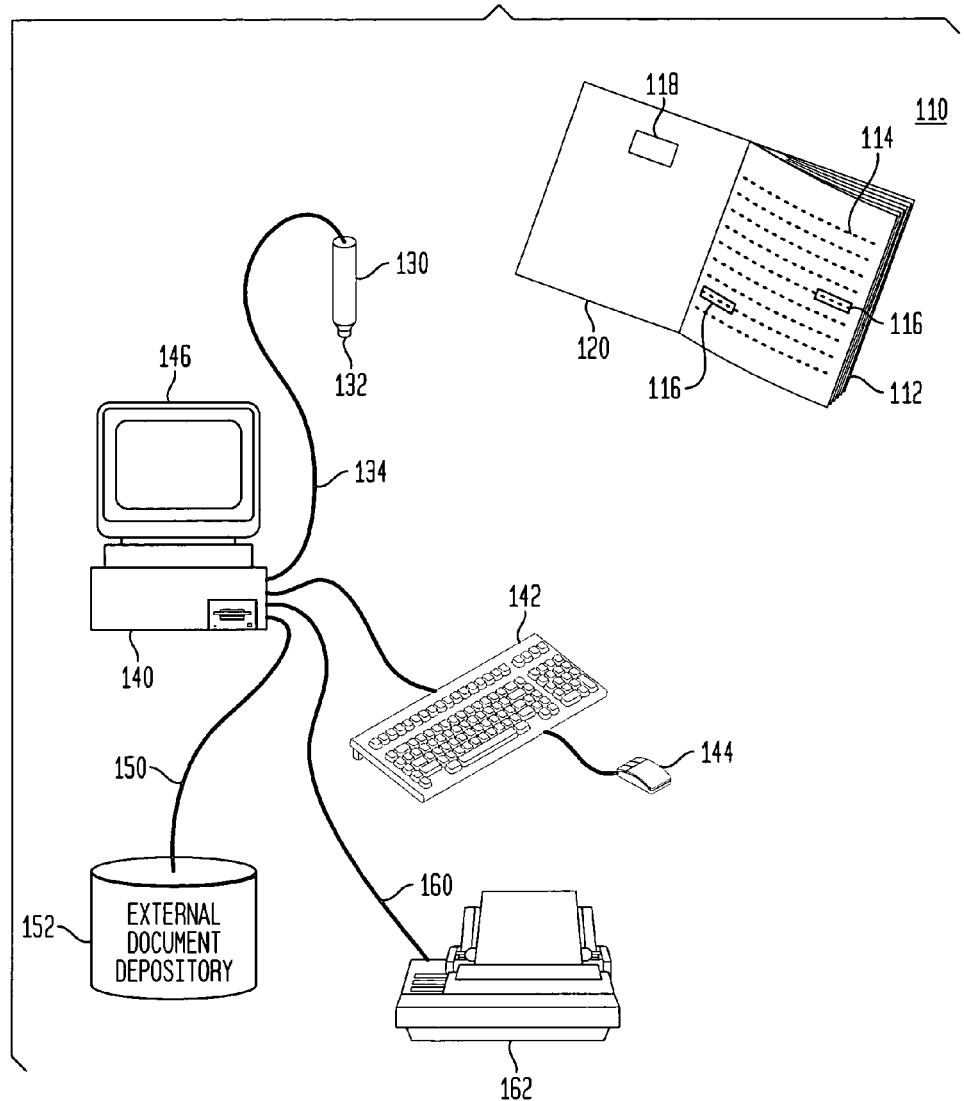
FIG. 1 is an illustration of an embodiment of a system for retrieving electronic information via embedded pointers in printed materials using the initialization marking of the present invention.

As seen in FIG. 1, an illustration of one embodiment of the system, a book, magazine, or other printed material or document 110, has one or more pages 112, containing areas of text 114. Particular areas of the text 114 are marked with one or more marking 116. Although the embodiment described discusses and shows solely text, it is understood that it can also contain tables, graphs, illustrations, photographs or any other means of visual communication, all of which can similarly be marked with one or more markings 116. The marked area can be a particular word, sentence, entire paragraph, illustration or part of an illustration and can be located on one of the printed pages 112 or on the book or document cover 120.

The actual method of marking, i.e., the actual form of markings 116, is not an essential element of the invention, and can therefore be done in any manner that can be recognized by some form of external sensory device known in the art. The sensory device provided will naturally be matched to the type of markings used on the printed material. More than one form of marking may also be used, matched perhaps to different functions, being readable by one or more external sensory devices.

In particular, the invention includes a special mark 118, called an initialization marking, shown in FIG. 1 as being located on the inside of cover 120, but locatable in practice in any convenient and easy-to-find location. The initialization marking 118 is used to initialize the system when the user first begins to read a particular book or document 110. The user scans the initialization marking 118 with the scanning device 130, which then transmits a code or instruction to the computing device 140 that tells the computing device 140 which book or document 110 is being read. This in turn allows the device 140 to access the stored data and instruction sets associated with that particular book or document, in preparation for the user requesting additional data or actions through subsequent scanning of various internal document markings 116. In this manner, only the initialization mark 118 needs to be unique between documents, thus allowing greater numbers of documents to be marked while still allowing the marks internal to any particular document to be kept quite small.

An appropriate sensing device 130, uses sensor 132 to "read" the code embedded in marking 116 and then transfer the code to a computing device 140, which does further processing and subsequently acts upon the information in the mark. The nature of the sensing device 130 is dependent upon the way the marking is done: if the mark 116 is a bar code (including invisible ones), the sensing device 130 and sensor 132 will be a bar code reader (with laser appropriately tuned to invisible light, if needed); if the mark 116 is otherwise embedded in the text/image 114, the sensing device 130 will again be some kind of a scanner, preferably an optical scanner enhanced with pattern-recognition hardware and/or software.

The mark 116 may alternately actually be the text 114 itself, in which case the scanning device 130 will constitute an optical reader in conjunction with optical character recognition (OCR) software that is configured to recognize specific words present in the text. An example of such a scanning device is the DataPen with Readiris OCR software product of Image Recognition Integrated Systems (IRIS) of Belgium. The IRIS DataPen consists of a pen-sized OCR scanner and PCR (pen character recognition) text recognition technology. It operates by sliding the DataPen over a line of text, entering the text into a Windows application. The unit can be powered by the PC keyboard, a small battery unit or an external power supply. Linguistic database driven, the maker claims that Readiris features an autolearn algorithm that makes use of linguistic data during the recognition step and supports eleven linguistic databases, 13 language dictionaries and one numeric dictionary.

As mentioned above, it is also possible to use more than one type of marking 116 in a particular book or document 110, scannable by the same or a different device 130. In any case, the sensing/scanning device or devices 130 will each have a wired or wireless connection 134 to a computing device 140 for transferring the information embedded in the mark 116.

In the preferred embodiment, computing device 140 is a desktop, portable, handheld or wearable personal computer, with or without a connection to a network, modem, or Internet access line. Upon reception of a code from marking 116 on the book 110, the computing device 140 processes the code and carries out the related instruction, such as retrieving the required information from the computing device's own internal storage, from the intranet, Internet, or other external document depository 152, and displaying it on a monitor, screen, or other display device 146; sending the content of the marked area to a remote recipient, using the electronic copy of the printed material stored at an appropriate place; or sending the content of the marked area or the retrieved data to an attached or remote printer 162.

Although, for convenience, the embodiment of FIG. 1 shows the links between the various components as solid lines, it is envisioned that the entire system may be constructed in a wireless manner. Thus connection 134 between sensing device 130 and computing device 140 may be either an attached wire or a wireless link, using any of the wireless linking methods known in the art. Similarly, connection 150 between computing device 140 and external document depository 152, which can, of course, include a remote database or databases, an intranet, the Internet, or any other such data repository known in the art, may also be through a wired network or wireless. Connection 160 between printer 162 and computing device 140 may similarly be wired (such as is normal for an attached printer), wireless (likely if the computing device 140 is hand-held or otherwise portable), or a network connection of any type known in the art.

The information displayed on monitor 146 or printed on printer 162 might contain data, including texts, graphs or other illustration, or possibly pointers for further electronic exploration (such as hypertext marks on Web pages), or can itself be a pointer to additional chapter/page/paragraph in the book or printed material 110, in which case it would serve as a form of electronic index. The user may optionally interact with the computing device 140 via keyboard 142 and/or mouse 144, allowing the user to request hard copies of the retrieved information via printer 162, to electronically save the retrieved information for transmission to a remote recipient or for future use, or to access additional information via the provided pointers and links.

In a preferred embodiment of the invention, bar codes are used for the initialization marking 118 and marks 116. These bar codes may be either visible or, preferably, invisible. If invisible bar code markings are used, their presence may optionally be indicated to the user by the presence of an icon or change in type face within the printed material. The invisible bar codes are printed over specific areas of text and are scanned by a bar code reader. The bar code reader is preferably hand-held but could, of course, be fixed so that the page could be passed either over or under the scanner. Invisible bar codes are known in the art, being created by using fluorescent dyes readable by laser scanners, such as those described in U.S. Patent No. 5,525,798 (Berson et al., Jun. 11, 1996) and under development by PSC, Inc. (Webster, N.Y.) and Symbol Technologies, Inc. (Holtsville, N.Y.), and even being printable by ink jet printers having the ink replaced by the fluorescent dye.

In a preferred embodiment using invisible bar codes, the area underneath the bar code 116 or 118 is printed beforehand in a different font to indicate the marker existence, or, alternatively, the presence of a marker 116 or 118 is indicated by an icon. In all cases the marked text remains readable by the eye in the normal manner. An alternate embodiment has a bar code or similar encoded mark 116 embedded visibly in the text, the marker itself in this embodiment serving both as a link and as an indication of the presence of a mark. Mark recognition in this embodiment is again accomplished by scanning followed by further processing, just as is done for the embodiment utilizing bar codes.

Figure 2:
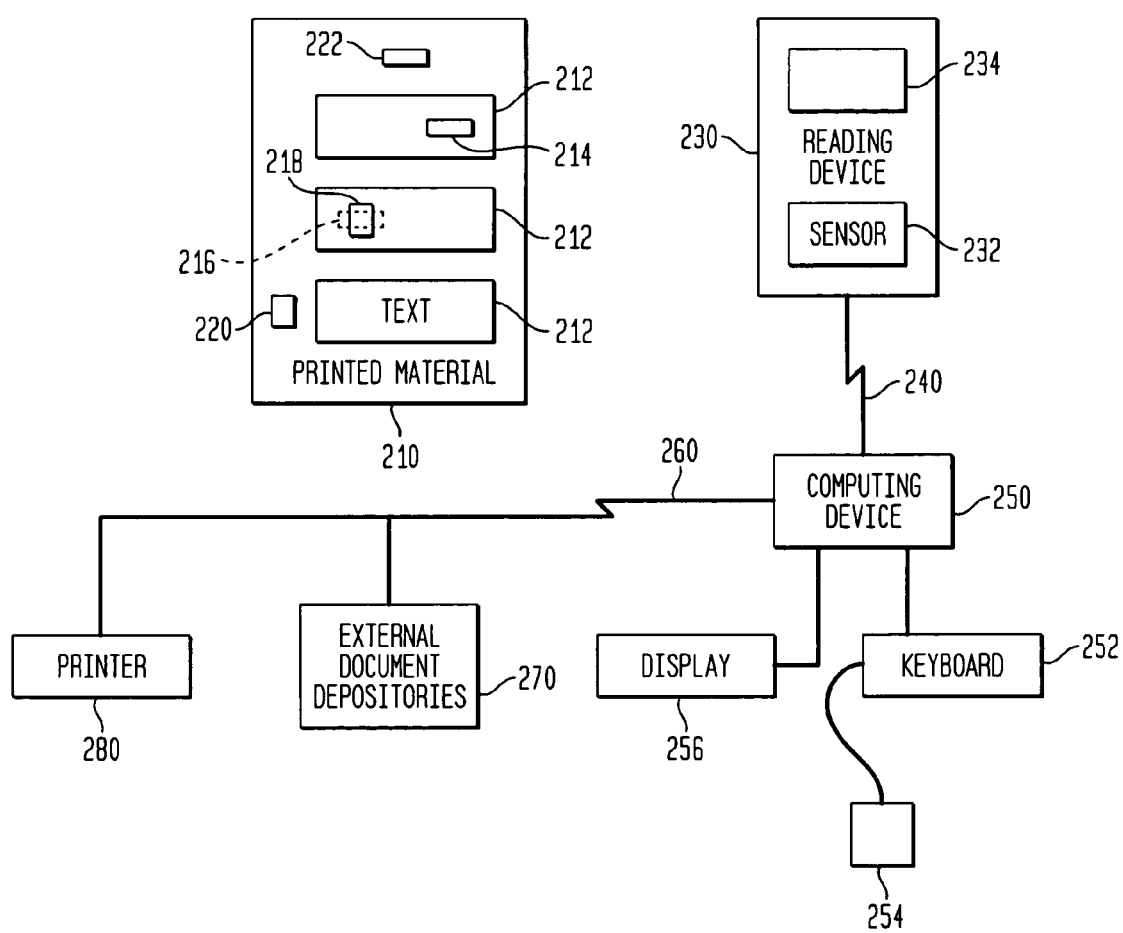
FIG. 2 is a functional block diagram of an embodiment of a system for retrieving electronic information via embedded pointers in printed materials using the initialization marking of the present invention.

The above-mentioned examples are further illustrated by the block diagram representation of a preferred embodiment of the system shown in FIG. 2. Note that although several possible implementation methods are described, the invention concept is essentially independent of the way it is implemented. The embodiment of FIG. 2 utilizes a book 210 containing blocks of text 212 marked with visible 214, or invisible 216 bar codes or other markings (forming a "hyperbook"). Invisible markings 216 may be further indicated by the presence of overprinted (preferably differentiated from the main text) text 218 or icons, indicating the presence of a marked area. Alternatively, visible markings 214 or icons 220 may be presented in the margins beside relevant text or illustrations, rather than within the text itself. Clearly, the invention is independent of the exact combinations of visible and/or invisible markings used, and any convenient combination of the above possibilities or any similar type of markings known in the art may be employed. In the preferred embodiment of FIG. 2, one or more initialization markings 222 are present, and may either take the same form as the in-text or margin markings used or any other convenient form, so long as all markings used may be read by the sensing device or devices employed.

As shown in FIG. 2, a computing device 250 is connected via a connection 240 to a reading or sensing device 230. Although the computing device 250 may of course be any convenient type of computing device such as a desktop computer or laptop, in a preferred embodiment, the computing device 250 would be a handheld personal computer (HPC) with access 260 to a wireless data service, which can be circuit- or packet-switched and based on any available air-interface standard. If the computing device 250 is an HPC, wireless access 260 is enabled through a PC card in the HPC, containing a wireless modem and radio-frequency transmitter and receiver. Wireless data service is needed for access to the Internet and Web pages, as well as other documents located in external document depositories 270. Web-based information is read with the help of a Web browser application running on the HPC (under Microsoft CE operating system, for example) or other computing device 250 and can be viewed and accessed directly by the user via one or more of a display 256, a keyboard 252 and/or a mouse 254. If the computing device 250 is an HPC, there will be no mouse 254, but rather display 256 will be touch-sensitive.

In the preferred embodiment of FIG. 2, the HPC or other computing device 250 has a pen-like or other shaped reading device 230 connected to it via connection 240 through the computing device communications port, although any other type of connection known in the art, including a wireless link, would be suitable. The reading device 230 has a sensor 232 and control logic 234 for transmitting the information read to the computing device 250. Reading or sensing devices of this type are well-known in the art and include bar code readers, such as those described in U.S. Pat. Nos. 5,468,951 (Knowles et al., 1995), 5,288,985 (Chadima, Jr. et al., 1994), and 4,916,441 (Gombrich, 1990), optical character readers, and optical scanners. The control logic 234 may optionally contain logic for partially or completely translating the code obtained from the marking into an instruction executable by the computing device 250.

When reading the paper-printed hyperbook 210 and encountering an image or a piece of text 212 where some background information is desired, the user points at the relevant marking 214 or 216, or scans it, with the reader 230. As an example, the scanning action reads from the marking 214 or 216 the address of a Web page located in the external document depository 270 where relevant information is stored and transmits this address along link 240 to computing device 250. Computing device 250 calls up the relevant Web page from depository 270 (e.g., a server accessed over the Internet) and the text (or graphics or video) information will be displayed on the computing device display or monitor 256.

In the preferred embodiment of FIG. 2, in order to facilitate the search and reduce the address space to be stored in the bar code, the Web homepage of the hyperbook publisher is accessed first, by scanning the initialization mark 222 contained either in or beside the hyperbook title or ISBN number and marked in the same manner as text/images. Of course, instead of a Web page, the information retrieved can also be a pointer to the place in the hyperbook itself where relevant information can be found, or any other relevant type of data or image file. Furthermore, certain markings can also be designed to instruct the computing device 250 to send the relevant text, paragraph, image from the book 210, or, alternatively, any retrieved data, electronically to a designated recipient, file, or attached or remote printer 280. When several such options are available, the user will be prompted by the computing device 250 via the display 256 to select among the options, utilizing the keyboard 252 and/or mouse 254 and/or touch-sensitive display 256, or by scanning scanning markings 214 or 216 provided for the purpose.

Figure 3:
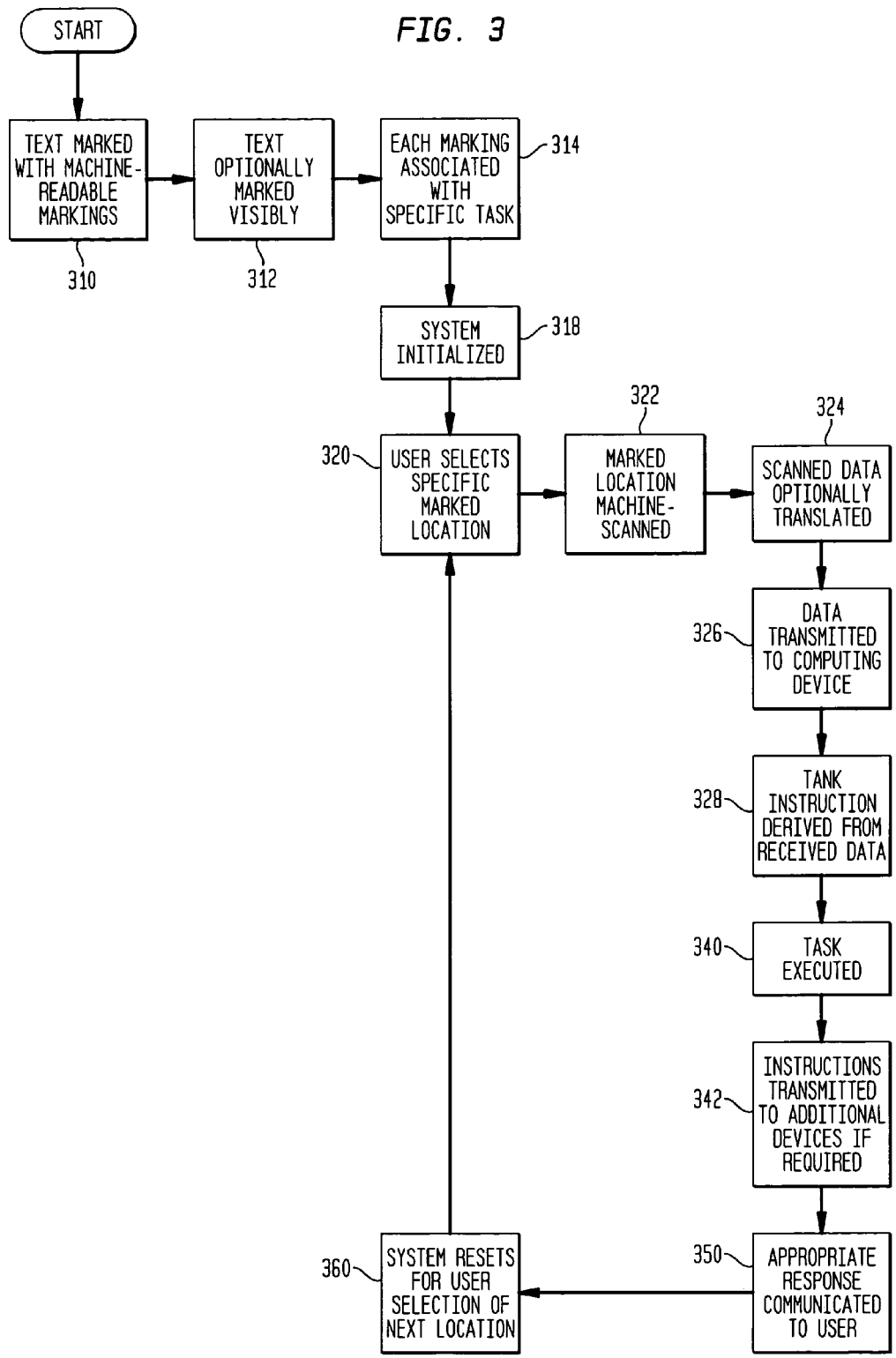
FIG. 3 is a block diagram illustrating the operation of an embodiment of a system according to the present invention.

The operation of an embodiment of the system is illustrated in FIG. 3. Initially the text or document is marked with machine-readable markings 310. If invisible markings were used, the text may also be optionally marked visibly 312. Each machine-readable marking is associated with a specific "task" 314, such tasks being any of the types of tasks previously discussed, such as the retrieval and display of data from a certain location or the printing of a hardcopy of the associated text or retrieved data, or can be any other related sort of task the system designer can arrange to be performed using the various system components.

Once the particular hyperbook has been designed and the system programmed to perform the relevant instructions, the user desiring to work with the hyperbook initializes the system for that book 318. This initialization is preferably performed by use of an initiation marking, but can also be performed in any of the many other ways known in the art, such as by selecting the title of the book off a menu provided on the computing device. The user next selects a specific marked location 320 to be further explored or printed, and then scans the machine-readable mark 322. The scanned data is either sent directly to the computing device 326, or is optionally completely or partially translated 324 by the scanning device and then transmitted to the computing device 326. The computing device derives the task instruction from the received data 328 and executes the relevant task 340.

If the instruction cannot be executed solely by or on the computing device, relevant instructions or requests are transmitted to any of a variety of external devices 342. Such devices might include an intranet or other network, the Internet, an attached database repository, or an attached or remote printer. After the computing device receives the appropriate responses and/or completes execution of the relevant instructions, the appropriate response is communicated to the user 350. As previously discussed, such responses are likely to include (but are not limited to) one or more of the following: display of text, images, or video, printing of text or images coming either from the hyperbook or from retrieved data, presentation of links to additional data either within the hyperbook itself (thus operating as a form of electronic index) or in some local or external data depository, presentation of requests for additional input to the user, or sending of data from the hyperbook or retrieved data to a remote recipient. Once the user has received the information, and has responded to requests for additional input, if any and/or appropriate, the system resets itself 360 in anticipation of user selection of another marked location 320.

As is readily apparent, the method of the invention has any number of useful applications. Examples of potential applications include engineering textbooks having marked links to problem solutions, additional examples, and refresher background material, law texts having links to the full text of cited cases and an on-line law dictionary, and printed patents with links to cited references. The invention could be particularly beneficial in an educational context, with texts and handouts having links to such things as electronic versions of each other, to additional examples, to expanded information about important and/or supplementary topics, and to an electronic version of the professor's outline or lecture notes.

The above examples illustrate some of the particular advantages of the invention, such as being able to have a great number of printed media sources (books, magazines, etc.), that can last and be reused over a long period of time, so long as the appropriate data and/or links are maintained on the computing device and/or network. This advantage is particularly enabled by the use of an initialization mark, an element of the invention that not only ensures that the proper data and/or instruction set is being accessed but also allows the internal marks used on one document to be re-used on a great number of other printed materials, so long as each document has been linked to a different initialization mark.

In one embodiment of the invention contemplated by the inventors, the markings supplied in a group of textbooks will be linked to specific web pages supplied in a software package. The content of the linked web pages may be pre-set, or the administrator or "superuser" (such as the professor in an educational setting) may have the ability to edit the web page to contain the desired reference material, including such things as links to relevant handouts, lecture notes, or examples.

Figure 4:
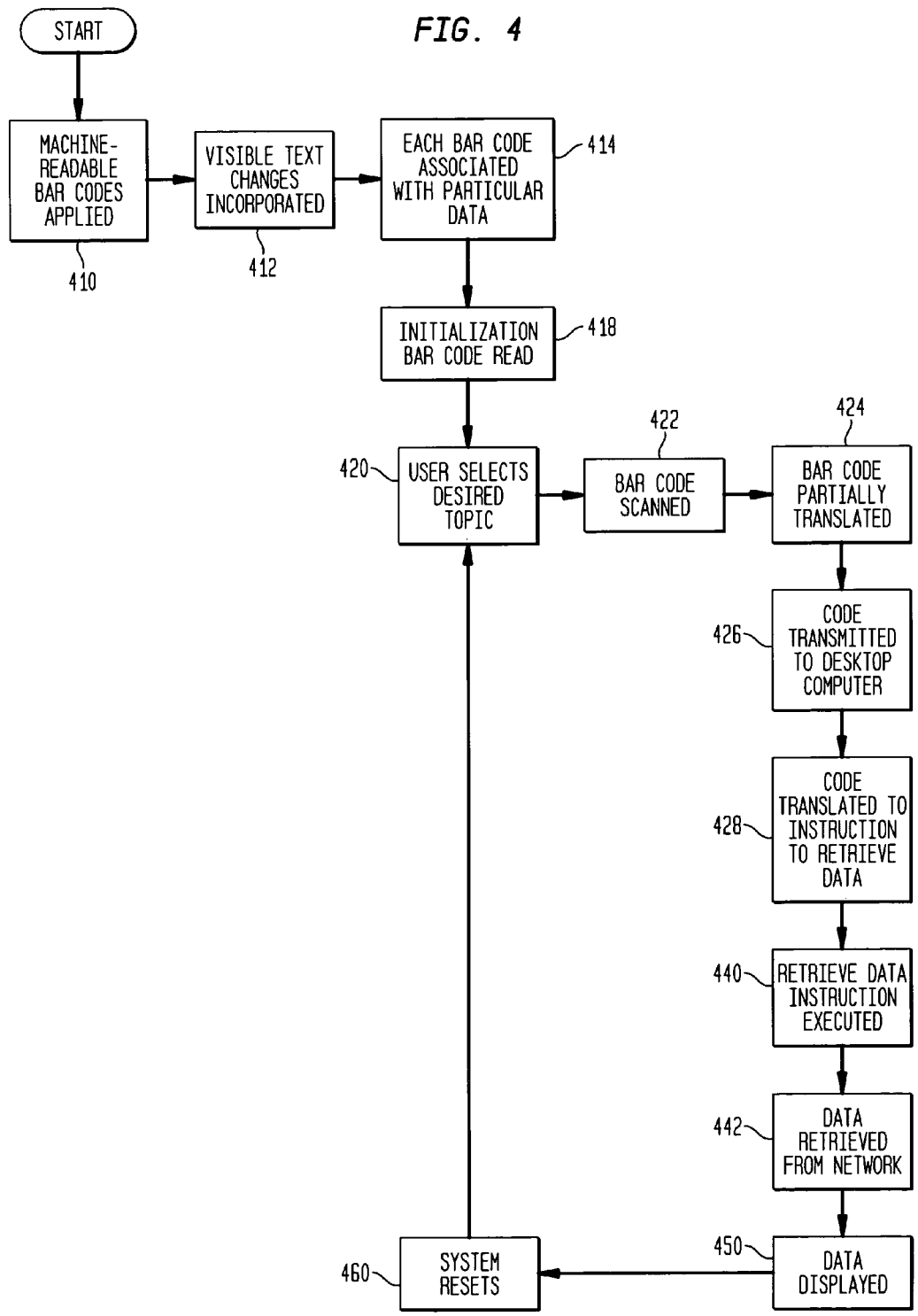
FIG. 4 is a block diagram illustrating the operation of a particular embodiment of a networked system utilizing bar code markings according to the present invention.

FIG. 4 shows a block diagram of a preferred embodiment of a networked system that utilizes bar codes and displays data retrieved off a network to the user at the user's location. A "hyperbook" (or other printed material) is created with the following properties: its entire or partial content (text and/or illustrations) is stored in an electronic form; the storage device(s) including local and/or remote computer permanent memory (like hard disk), compact disk (CD) or other permanent storage media; the electronic content can be displayed in full or in part on the screen of a computing device (desktop, laptop, or notebook computer, personal digital assistant, cellular phone, and similar); special machine-readable markers (invisible bar codes in this embodiment) are printed over the ordinarily printed text 410, or the markers are printed first and then the visible text is printed over them 412; the markers cover either words in the hyperbook text (including body, cover pages, index, book covers etc.), and/or pieces of text (like sentences or paragraphs), and/or illustrations in the text, and/or are placed next to the text in the margins. Each bar code used is associated with a particular address or instruction 414.

To use a familiar Web model of electronic storage, assume that the text and/or illustrations of a hyperbook are stored into a Web page using the HTML (Hypertext Markup Language), that is, are stored in an electronic file which can be read locally using an appropriate browser (Netscape or Internet Explorer), or remotely (also using the browser), in which case the file is addressed by the computing device's Internet/Web address and its position in the hierarchical directory structure. As a specific example, assume the hyperbook in question is *Digital Satellite Communications*, published by McGraw-Hill in their Communications Series, with ISBN (International Standard Book Number) 0-07-025389-7. The Web page address where the content of the book is stored could be, for example, http://www.mcgraw-hill.com/communications_series/0-07-025389-7.html, i.e. the publisher's home server, where the file is stored, is at Internet address "www.mcgraw-hill.com", the file is in directory "communications_series", and the file name is "0-07-025389-7.html", where the extension*.html designates a Web-type document. The entire Web address can be encoded into a bar code and printed (invisibly) over the ISBN code printed in the hyperbook. Alternatively, if the bar code reader is capable of reading visible bar codes (as well as invisible), we can first scan the visible bar code which is now often printed on the book cover next to the ISBN. Since the ISBN contains the publisher's code and the book code, all the initialization information can be deduced from ISBN. In either case, the user initializes the system 418 before beginning to read the hyperbook by reading the bar code associated with the book's ISBN number, either from the visible or from the invisible bar code. In this way, communication is established with the remote computer where the file is stored, such as by reading out the Internet address and starting a TCP/IP session (other types of protocols can also be used), and therefore enable access to the stored electronic version of the hyperbook.

In the example of FIG. 4, the invisible marks in the hyperbook have exactly the same meaning as the underlined (or differently colored or identified in some other manner) words and/or illustrations on Web pages. Namely, they contain a pointer to some other Web page (that is, the Internet address of that other page), with more information on the word/paragraph/illustration in question, or a pointer to some other place on the same Web page. For example, in the former case, if the word TDMA was marked with the invisible bar code; then what might be coded into the bar code is http://www.crc_press/handbooks/0-8493-0185-8.html#TDMA. (Ibis means that the contents of the book with ISBN 0-8493-0185-8, published by the CRC Press, is stored in the computer at Internet address "www.crc_press", in the file "0-8493-0185-8.html" in the directory "handbooks", and that at position "TDMA" in the hypertext there is more information on time-division multiplex access or TDMA.) In the latter case, if, for example, the words "frequency modulation" are marked with the invisible bar code, then what might be coded into the bar code is the pointer to a page in the same book where the frequency modulation process is explained in more detail.

While invisible bar codes would be used in this preferred embodiment (to avoid otherwise messy texts), their positions are preferably indicated by use of different typeface, underlining etc. It could alternatively be left to the user to try everywhere in the text where more background information is desired, in which case no visible marks would be made. To facilitate this embodiment, much as is done on some Web pages where the change in the cursor icon (from arrow to little hand) indicates that there is a pointer, indication of the presence of a scannable mark can be accomplished by turning on an indicator light on the bar code reader while the page is being scanned or the reader is being deliberately pointed at some place.

Once the user has initialized and begun reading the hyperbook and selected the desired topic and bar code to scan 420, and the bar code has been scanned in 422, the bar code is translated 424 to an address that is sent to a desktop computer or other computing device 426. This computing device might or might not have the electronic version of the hyperbook stored locally (on hard disk, CD, or similar). The address is received by the computer and translated into a Web page request 428 that is sent 440 between the computing device and the Internet in some manner (via LAN, wireline modem, wireless modem). Even if there is a local copy of the hyperbook available, the Internet connection might be necessary for electronic content remotely stored and referred to in the hyperbook.

Scanning of the marking 422 having initiated the access to the remotely-stored information, the computing device now downloads the content of the requested file or Web page from the network 442. The content of the file is then displayed on the screen of the computing device 450 for the user to read. The system then allows the user to proceed in any of several manners, including scrolling up and down the electronic document, editing it if allowed, or printing the entire contents of the document or parts of it. Alternatively, if the document retrieved is a hypertext document itself, the user can proceed in the same manner as on the Web, that is, by following hyperlinks. When the user is finished with the retrieved information, the system resets 460 in order to be ready for the user to scan in another mark.

Figure 5:
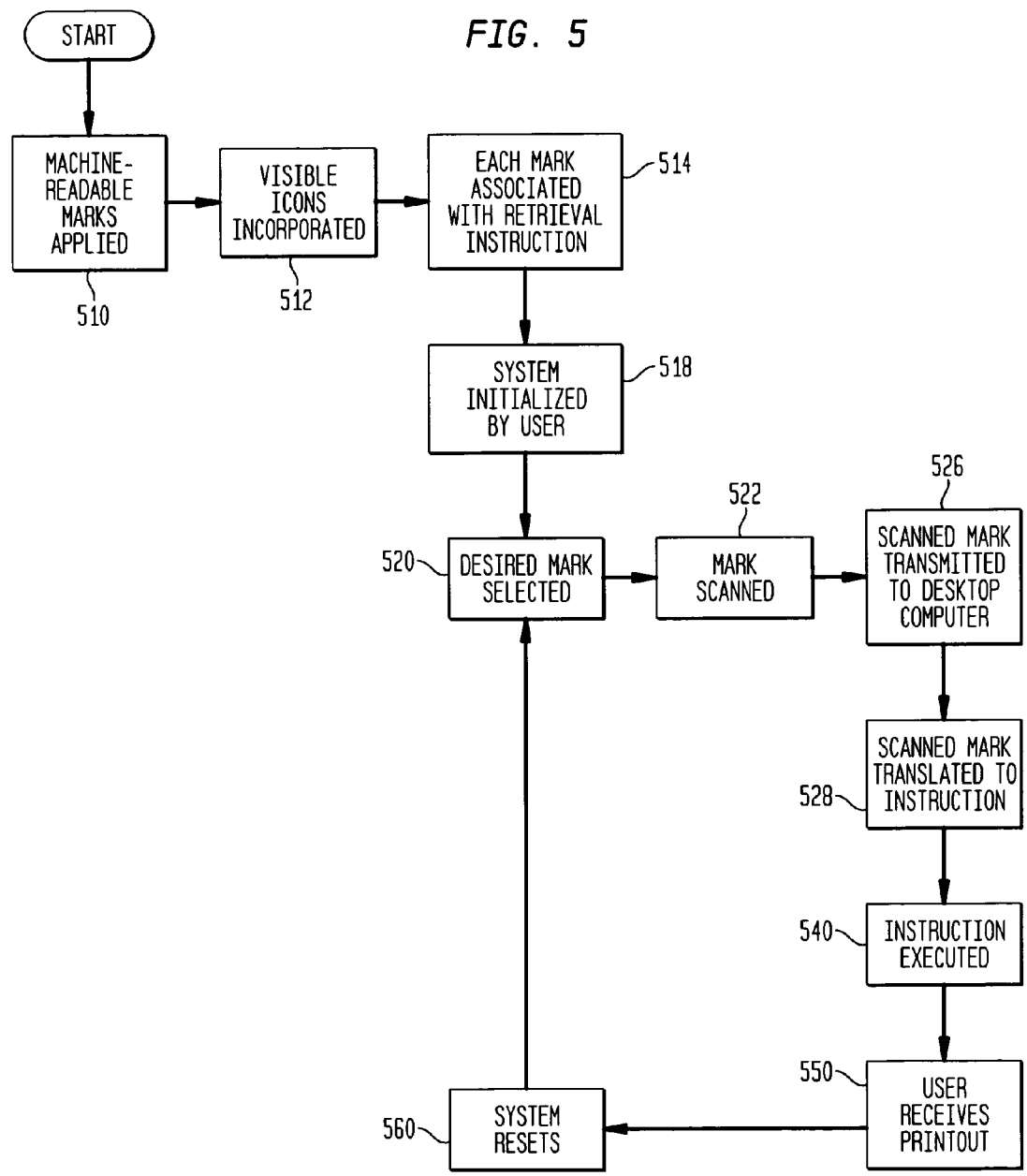
FIG. 5 is a block diagram illustrating the operation of an embodiment of a desktop system utilizing an attached printer according to the present invention.

In an alternate embodiment, as shown in FIG. 5, a stand-alone desktop system is constructed in a manner similar to the embodiment of FIG. 2, including having an attached printer. The hyperbook document is constructed by applying machine-readable markings 510 in any of the manners previously discussed or otherwise known in the art. If desired or necessary, additional visible markings are applied 512. Each mark is associated with a data retrieval instruction 514. The system is initialized by the user 518 by reading in the initialization marking, and the user proceeds to read the hyperbook. When the user finds a topic about which either more information, or printed information is desired 520, the user reads in the relevant marking 522 using the scanning device.

In this embodiment, the scanned marking is transmitted directly to the stand-alone desktop computer 526, the scanned mark is translated into a data retrieval instruction 528, and the instruction is executed 540 by the retrieval of the indicated data. The user is then presented with a printout 550 of the retrieved data, which will ordinarily be either expanded information on the topic or even just a hardcopy of the relevant section of text (thus functioning as a form of "high-tech" copying machine). When the data delivery to the user 550 is complete, the system resets 560 and waits for the next marking to be read in.

What has been described above is merely illustrative of the application of the principles of the present invention. In particular, the specific examples described are illustrations only, and, as is discussed through out the text, all of the various possible combinations of the many elements discussed, as well as the specific examples of those elements that have been given, are contemplated by the inventors. Other arrangements, methods, modifications and substitutions by one of ordinary skill in the art are also considered to be within the scope of the present invention, which is not to be limited except by the claims which follow.

What is claimed is:

1. An apparatus for retrieving and manipulating information in printed materials, comprising:
    a sole initialization designator uniquely marked to printed materials, as a first pointer having a first format, located outside the printed materials for identification purposes and initializing the apparatus when activated;
    one or more embedded machine-readable markings, which may be of the same or different format from the first format, as a second pointer, located within the printed materials, independent of the initialization designator and initiating executable tasks when activated;
    a scanner that recognizes the sole initialization designator once and thereafter recognizes at least one embedded machine readable marking in the printed document independent of the sole initialization designator in retrieving and manipulating information, each embedded machine-readable marking being associated with at least one printed item, each embedded machine-readable marking further being associated with a specific machine-executable task; and
    a processor that interprets the initialization designator, as the first pointer, and the embedded machine-readable marking, as the second pointer, and performs the specific machine-executable task after recognition of the initialization designator and the embedded machine-readable marking, wherein the initialization designator includes an International Standard Book Number (ISBN),
    wherein special embedded machine-readable markings, layered with printed text, are invisible to the human eye, and wherein a portion of the at least one printed item associated with each embedded machine-readable marking indicates the existence of each embedded machine-readable marking.

2. The apparatus of claim 1, wherein the initialization designator further comprises at least one of a bar code, an icon, and text altered in appearance and the scanner is adapted to recognize at least one of the bar code, the icon, and the text altered in appearance.

3. The apparatus of claim 2, wherein the initialization designator is a bar code and is only recognizable by the scanner.

4. The apparatus of claim 1, wherein the initialization designator further includes at least one instruction for accessing a web site.

5. The apparatus of claim 1 wherein the scanner includes a translator for at least partially translating the initialization designator.

6. The apparatus of claim 1, wherein the scanner includes a translator for at least partially translating the embedded machine-readable marking.

7. The apparatus of claim 1, wherein the embedded machine-readable marking comprises at least on of a bar code, an icon, and text altered in appearance and the scanner is adapted to recognize at least one of the bar code, the icon, and the text altered in appearance.

8. The apparatus of claim 7, wherein the embedded machine-readable marking is the bar code and is only recognizable by the scanner.

9. The apparatus of claim 1, wherein the specific machine-executable task includes at least one instruction for accessing a web site.

10. The apparatus of claim 1, wherein the processor comprises at least one networked data repository.

11. The apparatus of claim 10, wherein the specific machine-executable task comprises retrieving and displaying information from the at least one networked data repository.

12. The apparatus of claim 1, further comprising an output device for reporting the outcome of the machine-executable task to a user.

13. The apparatus of claim 12, wherein the output device comprises at least one of a data display, a printer, and a monitor.

14. The apparatus of claim 12, wherein the output device displays data retrieved from at least one networked data repository.

15. A method for retrieval and manipulation of electronic information associated with a printed document comprising:
   installing a sole initialization designator, as a first pointer having a first format that identities a printed document and preferably located outside the printed materials and initializing the apparatus when activated;
   installing one or more embedded machine-readable markings, in the same or a different format from the first format, as second pointers, located within the printed materials, independent of the initialization designator and initiating executable tasks when activated, wherein the initialization designator includes an International Standard Book Number (ISBN);
   uniquely identifying the printed document using the initialization designator only once in retrieving and manipulating information;
   subsequently recognizing at least one embedded machine-readable marking in the printed document, independent of the sole initialization designator, each embedded machine-readable marking being associated with a specific printed item in said at least one printed item, each embedded machine-readable marking further being associated with a specific machine-executable task;
   interpreting the embedded machine-readable marking', and
   performing the specific machine-executable task, wherein special embedded machine-readable markings, layered with printed text, are invisible to the human eye, and wherein a portion of the specific printed item in said at least one printed item associated with each embedded machine-readable marking indicates the existence of each embedded machine-readable marking.

16. The method of claim 15, wherein the initializing step includes the recognition of the initialization designator with a scanner.

17. The method of claim 16, wherein the initialization designator further comprises at least one of a bar code, an icon, and text altered in appearance and the scanner is adapted to recognize at least one of the bar code, the icon, and the text altered in appearance.

18. The method of claim 17, wherein the initialization designator is the bar code and is only recognizable by the scanner.

19. The method of claim 15, wherein the initializing step includes accessing a web site.

20. The method of claim 15, wherein the embedded machine-readable marking of the recognizing step comprises at least one of a bar code, an icon, and text altered in appearance and the scanner is adapted to recognize at least on of the bar code, the icon, and the text altered in appearance.

21. The method of claim 20, wherein the embedded machine-readable marking is the bar code and is only recognizable by the scanner.

22. The method of claim 15, wherein the performing step includes accessing at least one web site.

23. The method of claim 15, wherein the performing step includes accessing at least one networked data repository.

24. The method of claim 15, further comprising the step of communicating the outcome of the machine-executable task to the user.

25. The method of claim 24, wherein the communicating step comprises displaying the outcome on at least one of a data display, a printer, and a monitor.

* * * * *